March 19, 1946.  N. V. KUEHLMAN  2,396,858
POWER CONTROL UNIT
Filed March 31, 1944  3 Sheets-Sheet 1
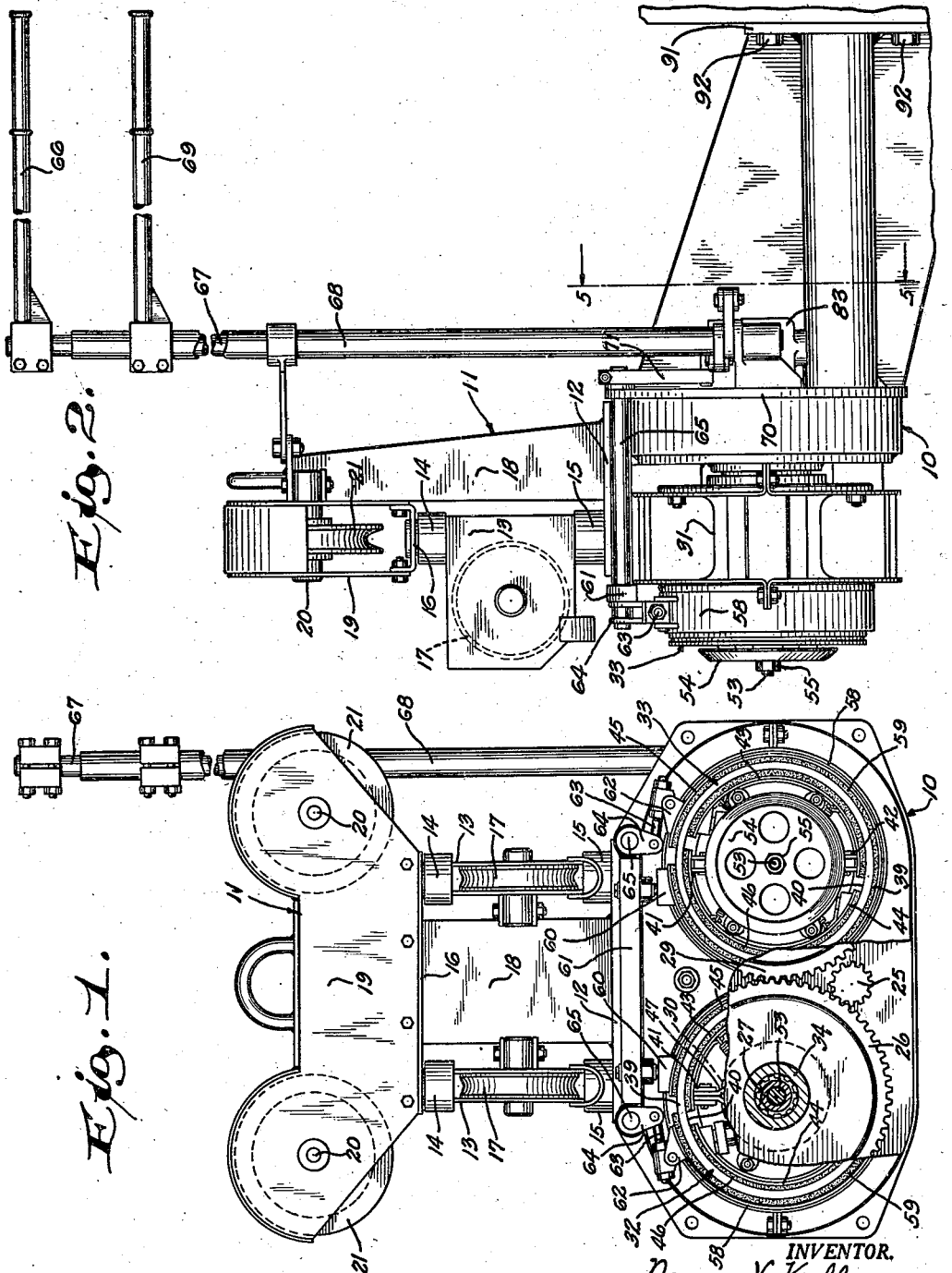
INVENTOR.
Norman V. Kuehlman,
BY Morsell & Morsell
ATTORNEYS.

March 19, 1946.  N. V. KUEHLMAN  2,396,858
POWER CONTROL UNIT
Filed March 31, 1944  3 Sheets-Sheet 2

INVENTOR.
Norman V. Kuehlman,
BY Morsell & Morsell
ATTORNEYS.

March 19, 1946.   N. V. KUEHLMAN   2,396,858
POWER CONTROL UNIT
Filed March 31, 1944   3 Sheets-Sheet 3

INVENTOR.
Norman V. Kuehlman,
BY Morsell & Morsell
ATTORNEYS.

Patented Mar. 19, 1946

2,396,858

UNITED STATES PATENT OFFICE 2,396,858

POWER CONTROL UNIT

Norman V. Kuehlman, Milwaukee, Wis., assignor to The Heil Co., Milwaukee, Wis., a corporation of Wisconsin Application March 31, 1944, Serial No. 528,858

4 Claims. (Cl. 192—14)

This invention relates to improvements in power control units, and particularly to a construction which is adaptable to a power control unit or winch of a relatively small size without any sacrifice of strength power and facility of operation.

A general object of the invention is to provide a power control unit adapted to be mounted on a tractor whereby the tractor operator may control the operation of various elements of an implement, such as a scraper, which is connected to and moved by the tractor, the power control unit including a pair of drums and which, although affixed to a portion of a tractor so as to receive their power from the power take-off shaft of the tractor, may be readily bodily removed for repairs and replacements.

A more specific object of the invention is to provide a power control unit wherein the drums are mounted fast on tubular drum shafts which are revoluble but fixed against longitudinal movement with clutch control shafts passing axially through the drum drive shafts and being fixed against rotation but having independent longitudinal movement.

A further specific object of the invention is to provide a power control unit wherein independent clutch control shafts, passed centrally through drum drive shafts, are independently longitudinally movable for the purpose of operatively engaging self-energizing clutch mechanisms for the control of the rotation of the drums.

A further specification object of the invention is to provide a relatively small sized power control unit which is simple and inexpensive and wherein operation of the drums can be controlled through a minimum of physical effort imparted to the control levers, with the drum clutches being very positive and quick in their action.

A further object of the invention is to provide a double drum power control unit assembly including an independent brake and drum arrangement and assembly so that the clutch and brake elements for one drum are identical to those for the companion drum and are interchangeable, the power control unit additionally insuring identical application and release of power relative to the sets of clutch and brake members for both drums.

A further object of the invention is to provide a power control unit which is simple and efficient in its operation, which may be mounted on standard tractors in a manner to facilitate access to the internal mechanism for repairs, adjustments and replacements, which is strong and durable and which is well adapted for the purposes described.

With the above and other objects in view the invention consists of the improved power control unit and its parts and combinations as set forth in the claims and all equivalents thereof.

In the accompanying drawings in which the same reference characters indicate the same parts in all of the views:

Fig. 1 is a rear end view of the improved power control unit assembly with parts broken away and in section to show structural details;

Fig. 2 is a side view of the power control unit;

Figure 3:
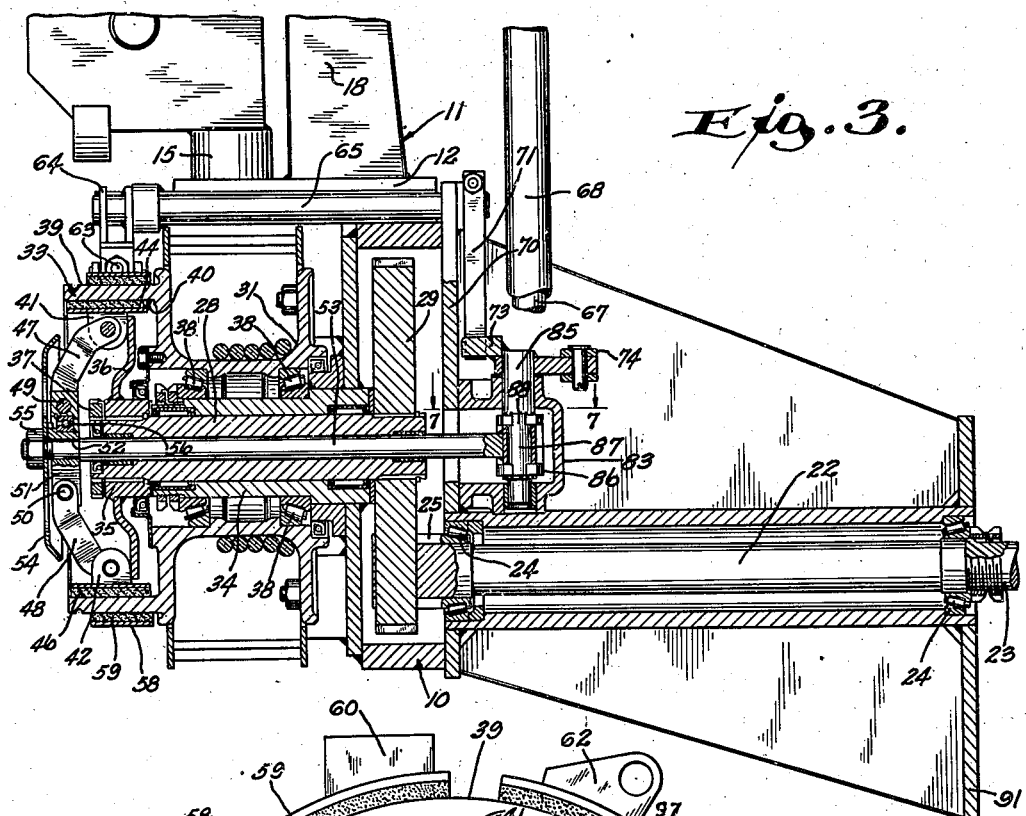
Fig. 3 is an enlarged longitudinal vertical sectional view through one of the drums of the power control unit.

Referring now more particularly to the drawings it will appear that the improved power control unit or winch is of the double drum type and includes a lower housing, designated generally by the numeral 10, and an upper framework or supporting structure, designated generally by the numeral 11. Certain driving gears and shafts are enclosed by the lower housing with which are also associated cable winding drums, and brake and clutch mechanisms, all hereinafter to be described more in detail. The upper framework or supporting structure serves as mounting means for cable guiding sheaves, and other members.

The upper framework is separated from the lower housing by an intermediate, horizontal supporting plate 12 on which is mounted in spaced relationship a pair of pivotal sheave enclosures 13. Each sheave has upper and lower trunnions 14 and 15, the upper trunnions being associated with an upper sheave plate 16. Lower cable guiding sheaves 17 are revolubly mounted in the enclosures 13, each of said enclosures, with its sheave, being pivotal on a vertical axis.

Projecting upwardly from the supporting plate 12 is a flanged, vertical support 18 to a rear upper portion of which is affixed an upper sheave enclosure 19. Upper sheave shafts 20 are mounted in spaced relation in the enclosure 19 and carry upper sheaves 21.

The lower housing 10 and other parts and mechanisms associated therewith depend from the horizontal plate 12. Extending from the forward end of the assembly inwardly into said housing is a horizontal drive shaft 22. An outwardly projecting portion of said shaft has a detachable connection with a coupling extension 23 by which means connection is made with the power take-off shaft of a tractor, as is usual. Portions of the shaft 22 within the housing are journaled in suitable roller bearings 24 and the inner portion of said shaft is formed with an integral pinion 25. Said pinion meshes with a large gear 26 splined on the forward end of a drum shaft 27. Said drum shaft 27 is horizontally disposed and in the same horizontal plane therewith, but spaced therefrom is a similar second drum shaft 28 having splined on its forward end a large gear 29 which meshes with and is driven by the large gear 26. Loose on the shafts 27 and 28, rearwardly of the gears 26 and 29, are cable winding drums 30 and 31 respectively, with the movement of the drums being controlled by clutch and brake members, indicated generally by the numerals 32 and 33 respectively.

As the structure and mounting of each drum and its respective clutch and brake member is the same as the other, only one set of the same (drum 31 and its associated parts) will be described in detail. Between the drum 31 and the shaft 28 is a spindle extension 34 which is retained on the shaft 28 by the hub 35 of a clutch operating plate 36, said hub being splined on the rear end of the shaft 28 and the extremity of the shaft being provided with an additional retainer nut 37. Relatively large roller bearings 38 facilitate easy rolling movement of the drum on said spindle extension 34. The rear head of the drum 31 has an extension forming an annular outer brake drum 39 and an annular inner clutch surface 40. Secured to unanchored ends of complementary clutch shoes 44 and 43 respectively are a pair of diametrically opposed bosses 41 and 42 which have sliding surface contact with the face of the clutch plate 36. Each clutch shoe is substantially semicircular and the ends of shoe 43 are slightly spaced relative to the ends of shoe 44. Also, said shoes are spaced slightly radially inwardly of the clutch surface 40 and carry clutch bands 45 and 46 adapted to wrap on and frictionally engage the surface 40 for clutching purposes. The ends of the shoes 43 and 44 opposite the ends carrying the bosses 41 and 42 are anchored to the clutch plate 36 through the following arrangement: Tapped plates 95 are secured to and project outwardly from the outer face of the clutch plate 36 (see Fig. 4). Also, adjacent said plates 95 the shoes 43 and 44 have fast thereon angular blocks 96 provided with tapped openings 97 to aline with the tapped openings in the plates 95 and with tapped openings 98 in said portions of the shoes 43 and 44. The threaded shanks of bolts 99 are extended through the plates 95 and into the blocks 96. Hence, one end of each shoe 43 and 44 is anchored to the clutch plate 36 whereby rotary motion is transmitted from the driving plate 36 to the clutch shoes. The other ends of the clutch shoes which carry the bosses 41 and 42 are susceptible of movement for initial energization, as will appear. The outer ends of yokes 47 and 48 are pivotally mounted on pins carried by the bosses 41 and 42 while the diverged arms of the yokes 47 and 48 are pivotally mounted on pins 49 and 50 carried by opposed peripheral portions of a clutch disc 51. The apertured central portion of the latter surrounds a nut 52 fast on the rear end of a clutch control shaft 53 which also carries fast thereon a cover plate 54 held by a nut 55. Roller bearings 56 are interposed between the nut 52 and the clutch disc 51. The cover plate is apertured, as best shown in Fig. 1, whereby air may be drawn in to cool internal mechanism during revolution of certain of the parts.

It has heretofore been noted that the drum shafts 27 and 28 are positively rotated through the gears described. However, said drum shafts are held against axial or longitudinal movement. Each drum shaft is, moreover, provided with a longitudinal central bore. It will be observed from Figure 3 that a clutch control shaft (53 in Fig. 3) extends loosely through each drum shaft, the arrangement being such that the clutch control shafts do not revolve and are independent of the drum shafts, but are free to move longitudinally in the bores of said drum shafts. This longitudinal movement of the clutch shafts with the revoluble movement of the drums and the clutch extensions carried thereby is utilized in applying and releasing the clutches to render the drums revoluble or stationary, while the drum shafts are turning.

Figure 4:
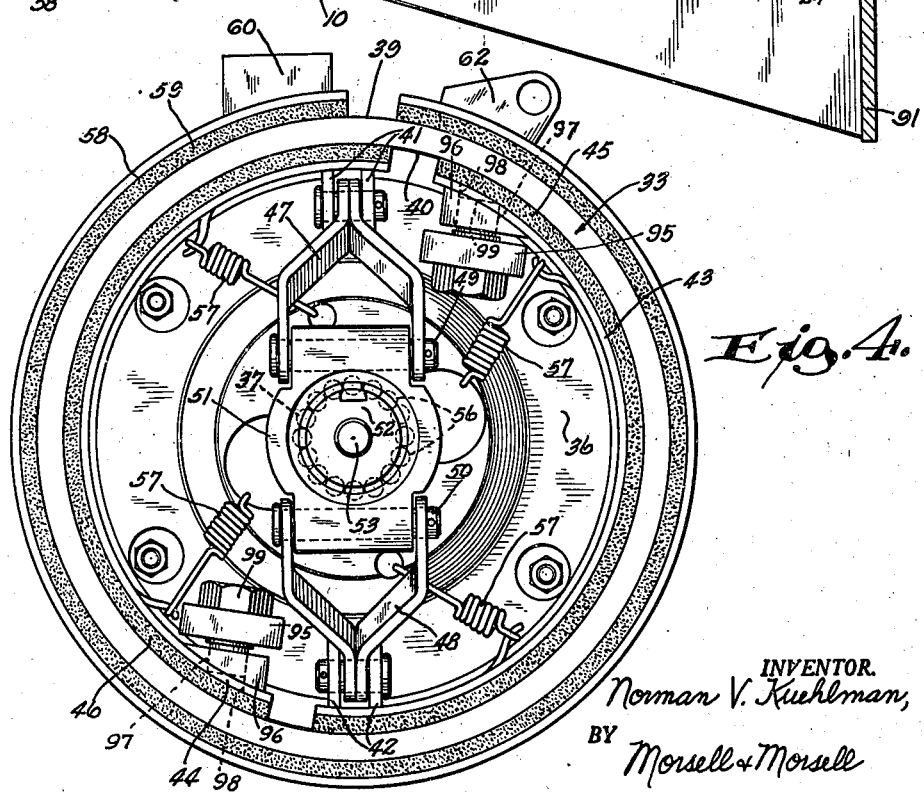
Fig. 4 is an enlarged rear end view of the clutch of one of the power control unit drums with its end covering plate removed to show features of construction.

From Fig. 4 it will be observed that one pair of ends of the clutch shoes 43 and 44 are anchored, while the other pair of ends which carry the yokes 47 and 48 can advance, wrap or unwrap. If a clutch is to be applied for the purpose of joining the drum (which is then stationary) to the driven drum shaft 28, then through levers and connections later to be described, the clutch control shaft 53 is pulled or caused to move axially to the right relative to Fig. 3. The disc 51 will thereupon be urged in the same direction, carrying with it the pivotally mounted yokes 47 and 48, which tend to straighten or move radially outwardly against the tension of anchored springs 57. That part of the clutch unit which includes the shoes 43 and 44, the yokes 47 and 48, and the disc 51, is revolving, because the same receive motion from the revolving drum shaft 28, and the direction of movement is clockwise relative to the showing in Fig. 4. Hence, when the yokes are moved by the clutch shaft 53 the clutch shoes 43 and 44, and the clutch bands 45 and 46 carried thereby are expanded or forced toward and frictionally against the curved clutch surface 40. The action is such that the clutch bands progressively increase their frictional engagement with said clutch surface throughout their entire lengths and become self-energizing after initial movement is imparted to the same through the movement of the yokes. Consequently very little pressure is required on the manipulating means for the clutch control shaft 53. Obviously, when the clutch is applied the drum extension 39 becomes joined to the revolving clutch parts and the drum is revolved for cable winding purposes. A longitudinal movement of the clutch shaft 53 in the opposite direction will operate the yokes 47 and 48 so as to contract the clutch shoes and bands and frictionally disengage the latter from the clutch surface 40 whereby the drum becomes disengaged from its revolving means. The releasing movement of the yokes is quickly aided by the springs 57.

The brake member for the drum under consideration comprises a brake shoe 58 carrying a split brake band 59 substantially encircling the brake surface 39 of the drum extension. The ends of the brake band are separated from each other, and one end of the shoe is anchored as at 60 to a frame element 61. The other end of the brake shoe is carried by a block 62 to which a rod 63 is pivotally attached. The outer end of said rod is pivotally carried by the end of a crank arm 64 which is fast on the rear end of a brake operating shaft 65. Obviously the brake for a drum 31 to retard or halt rotation of the latter is applied by a turning movement of the brake operating shaft 65 in a direction so as to swing the crank arm 64 to pull the piston 63 outwardly. As the rod is connected to the brake shoe-carried block 62 the brake band will be caused to tighten on the brake surface 39 to check its rotation. The brake is, of course, applied when the drum clutch is released and the drum is, therefore, free of its drive.

The similar brakes for each of the drums 30 and 31 are automatically operated by virtue of different positions of vertical clutch control rods 67 and 68, as turned by operating handles 66 and 69. The rods 67 and 68 are disposed on the forward side of the power control unit and the rod 68 is tubular so as to freely movably house the rod 67 which is extended therethrough. The outer clutch control rod 68 is for the purpose of controlling the clutch and brake for the drum 31, while the inner clutch control rod 67 controls the clutch and brake for the drum 30. It will be noted that the power control unit assembly includes an intermediate transverse, vertical plate 70. The brake operating shafts 65 for the two drums have their forward ends extended through and journaled in said plate (see Fig. 5). The extended ends of said shafts have fast thereon depending cam levers 71 and 72 respectively. Respecting the lever 71 which affects the shaft 65 for the brake on drum 31, it will be noted that it is arranged to be contacted by a curved, upstanding lug 73 which is fast on the end of a pivotally mounted lever 74 which is connected by a link 75 to another lever 76 which is mounted fast on the outer clutch control rod 68. Hence, when the control rod 68 is turned in a certain direction, through the lever 76, link 75, lever 64 and lug 73, the depending cam lever 71 will be swung in a clockwise direction relative to Fig. 5, to turn the shaft 65 in the same direction. Through the means previously described a winding or contracting force will be applied to the free end of the brake band 45 for the drum 31, thereby releasing the brake for said drum. The parts are returned to normal position when pressure on the operating handle 69 for the control rod 68 is released through the anchored springs 77 and 78. These springs synchronize movement for the mechanisms for both of the drums 30 and 31 and furthermore normally hold the brakes for both drums in "on" position.

Figure 6:
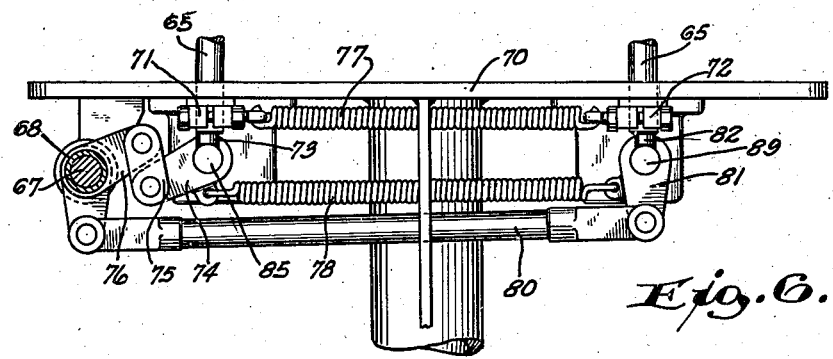
Fig. 6 is a plan view of the showing in Fig. 5.
Figure 5:
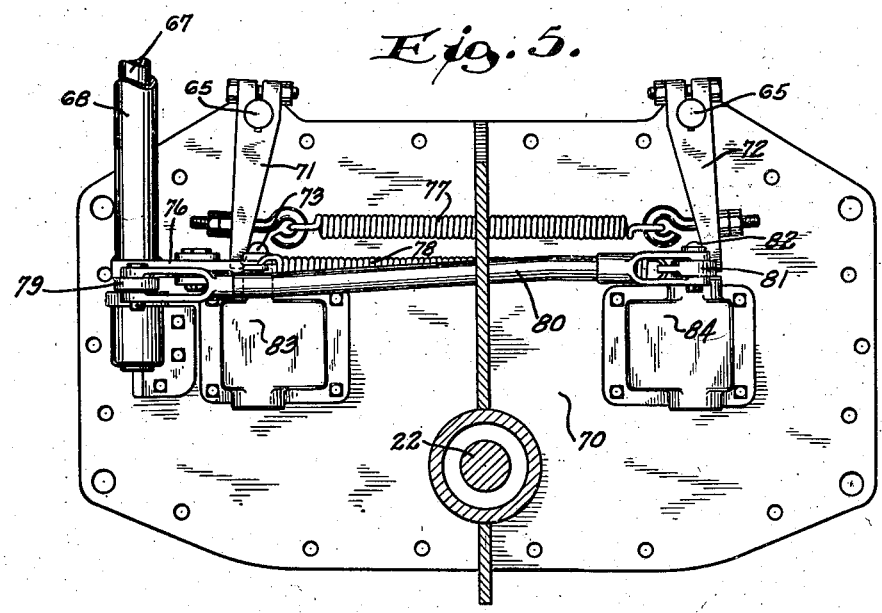
Fig. 5 is a transverse vertical sectional view taken on line 5—5 of Fig. 2 and on a larger scale.

Direct operation or release of the brake mechanism for the drum 30 is derived from the inner vertical control rod 67 as it is turned by its handle 66. With particular reference to Figs. 5 and 6 it will be observed that a lower portion of said rod 67 has secured thereto a lever 79 which is pivotally connected to the clevis portion of a rod 80. The opposite end of said rod is pivotally attached to a pivotally mounted lever arm 81 whose inner end carries a cam lug 82 to engage and swing the cam lever 72 depending from the brake operating shaft 65. Hence, through the means previously described the shaft 65, when thus turned, releases the brake for the drum 30, just as is accomplished relative to the brake for the drum 31, and against the force exerted by said springs 77 and 78.

The forward ends of the clutch control shafts 53 for the clutches for the drums 30 and 31 terminate in housings 83 and 84. Respecting the housing 83 it will be noted that the lever 74 (which is moved through the vertical control rod 68) is mounted fast on a vertical stud shaft 85, which depends into and is journaled in the housing 83. The housed portion of said stud shaft has a splined connection with a block 86. The forward end of the clutch control shaft 53, within the housing 83, carries a block 87 lodged within a recessed portion of the block 86, said block 87 having laterally projecting trunnion portions 88 which are journaled in portions of the block 86. When the vertical control rod 68 is turned, through the connections 76 and 75 the lever 74 will be swung in one direction or the other. This movement will turn the stud shaft 85 and likewise the block 86 splined thereto will be swung. Because of the crank and pin connection between the clutch control shaft 53 and the block 86, the clutch control shaft will be moved or reciprocated longitudinally, such movement being within the bore of the tubular drum shaft 28 and being effective to apply or release the clutch mechanism for the drum 31, as previously described.

Figures 7, 8:
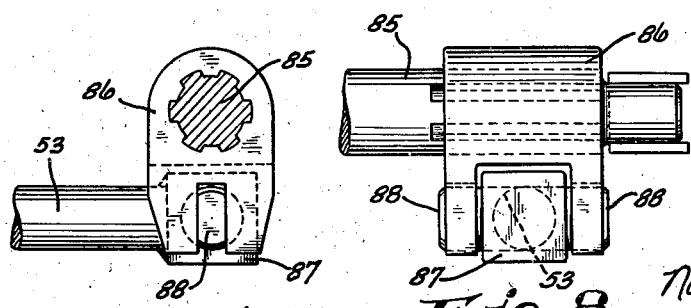
Fig. 7 is an enlarged fragmentary detail sectional view taken on line 7—7 of Fig. 3.
Fig. 8 is a view of the showing in Fig. 7 only at right angles thereto.

The housing 84 encloses similar connections for transforming rotary motion of the vertical control rod 67 to rectilinear motion for the clutch control shaft for the companion drum 30. As shown in Fig. 6 the lever 81, which is turned because of its connections with the rod 67, is mounted fast on a stud shaft 89. The latter is journaled in the housing 84 which includes connections with the other clutch control shaft similar to those described and illustrated in Figs. 7 and 8. The operative connections for both clutch control shafts incorporate eccentrics and the leverage is in favor of the machine operator. Hence, very little manual effort applied to the handles 66 and 69 is required to operate the clutches, and the same are very quick acting.

The improved power control unit is adapted to be mounted upon the rear portion of the transmission case of the tractor with which the power unit is to be associated. For this purpose the forward end portion of the assembly is provided with a flanged plate 91 formed with apertures through which bolts 92 are extended. While the power control unit is intended to be permanently mounted on the tractor transmission case, it will be appreciated that for different tractors or for different implements it may become desirable to replace the power control unit, and the flange 91 and method of attachment facilitates this procedure.

From the description heretofore given it is obvious that the operation of the several cable winding drums of the power control unit is manually controlled by an operator adjacent the two operating handles 66 and 69, which turn the vertical control shafts 67 and 68 for the longitudinal movement of the two clutch control shafts 53. With reference to the operation of one of the cable drums, as drum 31 (the operation of the other being similar) let it be assumed that the operator manipulates the hand lever 69 in a certain direction to effect engagement of the clutch mechanism for said drum in a direction to wind the cable on said drum. With this conditon existing the cam lever 71 will not be affected and hence the brake will remain in its "on" position. The drum is being caused to rotate, by engagement of the clutch, in a direction opposite to the natural wrap of the brake and the cable is wound on the drum or taken in, being held taut, If the vertical control shaft 68 is turned to a neutral position, a condition will exist where the clutch is off but the brake is on, whereby the cable is held taut.

A third position of operation, obtained through proper movement of the vertical control shaft, is that wherein the clutch is disengaged and the brake is released. The cable drum is then free to turn for unreeling and the cable may be played out.

From the foregoing description it will appear that the improved power control unit is simple in operation and construction, embodies parts which are readily accessible for repairs and replacements, provides a construction which permits ready and positive control of cable winding drums with a minimum of manual effort, and is well adapted for the purposes described.

What is claimed as the invention is:

1. A power control unit, comprising a stationary housing, a drum rotatably supported by the housing, a drive associated with the housing including a rotatable drive shaft extending through the drum and fixed against longitudinal movement relative to the housing and drum, said drive shaft being tubular, a clutch control shaft longitudinally movably extended through said drive shaft, and a clutch at the end of the drum for transmitting rotation from the drive shaft to the drum, said clutch being operatively connected with said control shaft and controlled by longitudinal movement of the latter, said clutch including an annular clutch surface on the drum, complementary, semi-circular clutch bands to wrap on and frictionally engage said clutch surface, springs connected to the clutch bands and anchored relative to the drive shaft, and snap action yokes pivotally carrying portions of said bands and pivotally anchored relative to the control shaft, whereby a longitudinal movement of said control shaft will initiate movement of said yokes to apply the bands to the clutch surface in a manner so that frictional application is progressively increased throughout the length of the bands.

2. A power control unit, comprising a housing having a projecting tubular stationary extension, a drum rotatably mounted on the extension, a drive associated with the housing including a rotatable drive shaft extending through said extension, said drive shaft being tubular, a non-rotatable clutch control shaft longitudinally movably extended entirely through said drive shaft, and clutch means at the end of the drum for transmitting rotation from the drive shaft to the drum, the clutch means comprising companion parts engaged and disengaged by longitudinal movement of the control shaft, one of said parts being on the drum and the other of said parts being carried by the drive shaft and movably connected with the control shaft.

3. A power control unit, comprising a housing having a projecting tubular stationary extension, a drum rotatably mounted on the extension, a drive associated with the housing including a rotatable drive shaft extending through said extension, said drive shaft being tubular, a non-rotatable clutch control shaft longitudinally movably extended entirely through said drive shaft, clutch means at the rear end of the drum for transmitting rotation from the drive shaft to the drum, the clutch means including companion parts engaged and disengaged by longitudinal movement of the control shaft, one of said parts being on the drum and the other of said parts being rotatably carried by the drive shaft and longitudinally movably connected with one end of the control shaft, and manual means applied to the other end of the control shaft for moving the latter longitudinally.

4. A power control unit, comprising a housing having a projecting tubular stationary extension, a drum rotatably mounted on the extension, a drive associated with the housing including a rotatable drive shaft extending through said extension, said drive shaft being tubular, a non-rotatable clutch control shaft longitudinally movably extended entirely through said drive shaft, clutch means at the rear end of the drum for transmitting rotation from the drive shaft to the drum, the clutch means including companion parts engaged and disengaged by longitudinal movement of the control shaft, one of said parts being on the drum and the other of said parts being rotatably carried by the drive shaft and longitudinally movably connected with the control shaft, spring urged, pivotal, carrying members engaging the last-mentioned clutch part to facilitate operation of the same.

NORMAN V. KUEHLMAN.